Nov. 1, 1966  R. M. HARTER  3,282,505

VENTILATING AND HEATING SYSTEM FOR AIR COOLED ENGINE CAR

Filed April 13, 1965

INVENTOR.
Robert M. Harter
BY
George E. Johnson
ATTORNEY

3,282,505
VENTILATING AND HEATING SYSTEM FOR AIR COOLED ENGINE CAR

Robert M. Harter, Lyndonville, N.Y., assignor to General Motors Corporation, Detroit, Mich., a corporation of Delaware
Filed Apr. 13, 1965, Ser. No. 447,661
5 Claims. (Cl. 237—12.3)

This invention relates to a ventilating and heating system for an air cooled engine car and constitutes an improvement in a system such as disclosed in the United States Patent 3,096,938, granted July 9, 1963, in the names of E. N. Cole and R. M. Johnston.

A problem that has arisen in systems such as referred to above is that ventilation air was drawn from the engine compartment by a blower and this air often became quite warm and above ambient temperature. It is desirable, obviously, that ventilating air should not be heated under some ambient conditions often encountered. Another problem has been that the mixing of outside air with heated air in proper proportions to gain a desired in-car temperature has resulted in high pressure heated air from a blower overcoming the pressure of incoming outside air. Attempts, prior to the present invention, in mixing outside air with heated air from a car engine, has resulted in the engine air forcing its way out the outside air entrance opening. This, of course, stops or reduces the entrance of outside air and the desired control of passenger compartment temperature is defeated to an objectionable extent.

An object of the present invention is to provide an improved ventilating and heating system for an air cooled engine car in which ventilation air need not be heated and in which proportioning of outside air with heated air may be controlled satisfactorily despite the use of a blower in the cooling of the engine or the supplying of heated air.

A feature of the present invention is a ventilating and heating system serving a passenger compartment for an air cooled engine car, the system having a blower for handling outside air, heated engine air, or proportions of outside air and heated air and also an improved damper and baffle arrangement facilitating the entrance of outside air to the passenger compartment during heating or mere ventilating operations.

This and other important features of the invention will now be described in detail in the specification and then pointed out more particularly in the appended claims.

Figure 1:
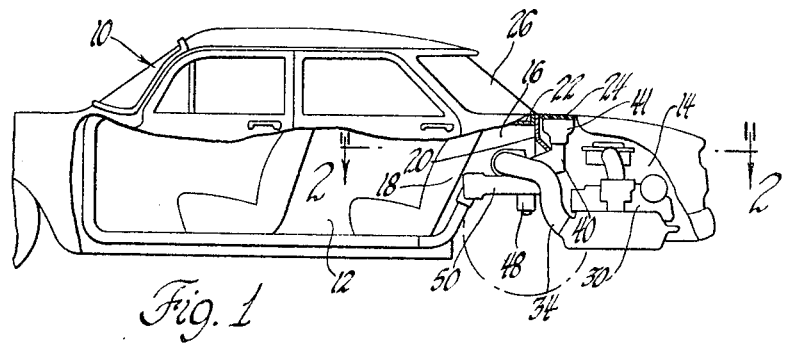
FIGURE 1 is an elevation view of an air-cooled engine car, a portion being broken away better to show the installation of the ventilating and heating system as an embodiment of the present invention.
Figure 2:
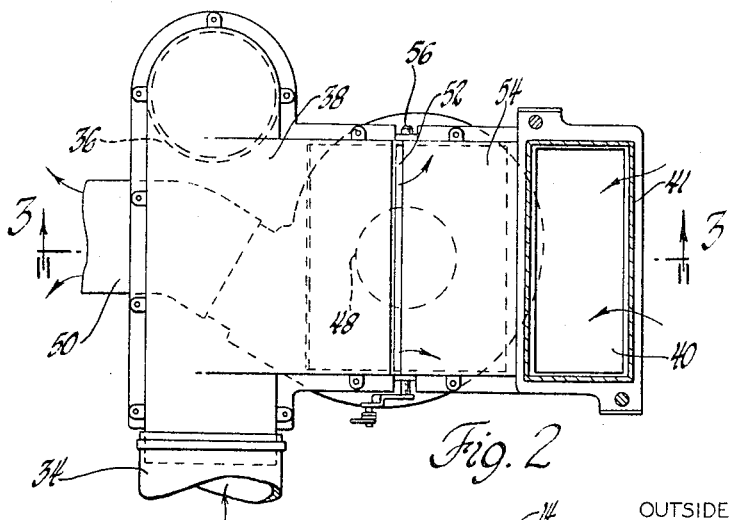
FIGURE 2 is an enlarged elevation view of duct work as viewed in the direction of the arrows 2—2 in FIGURE 1.

FIGURE 1 represents a portion of an air cooled engine car 10, portions of the body being broken away to illustrate a passenger compartment 12 and an engine compartment 14. An open space 16 is determined by partitions 18 and 20 and a rear package shelf 22. This space 16 is open to the atmosphere and is directed downwardly toward the ground. A grille 24 is located immediately forward of the engine compartment hood and immediately to the rear of the base of the rear window 26. The partition 20 is inclined at an intermediate area to accommodate a damper opening as will further appear.

Air utilized in cooling both banks of a gasoline engine 30 is received from the engine by way of ducts 34 and 36 to opposite ends of a damper casing 38. This casing has a duct 40, 41 at its rear portion communicating with the grille 24 to serve as an outside air admission duct. At the opposite or forward side of the casing 38 is a rearwardly directed deflecting wall 42 for guiding heated air to the casing. The casing has an opening 44 in its bottom for admitting air to a blower wheel 46. The latter is arranged to be rotated by a motor 48 so that air received by the blower wheel may be discharged forwardly through a duct 50 to the hot air distributing system of the passenger compartment 12. The top side of the casing 38 has an opening 52 and this is bridged in the direction transverse to the car by a fixed baffle or wall 54 which inclines downwardly toward the front of the car to terminate against a shaft 56. The shaft 56 serves as a pivot for a damper 58 which when arranged as shown in the solid lines in FIGURE 3 closes the opening 52 and the duct 40. With such closure, the baffle 54 precludes any air from passing from the duct 40 and by way of the opening 52 to the space 16 and all heated air from the engine or ducts 34 and 36 is forced by the blower wheel 46 into the passenger compartment 12. When the damper 58 is placed in the position indicated by dot and dash lines, heated air discharges through the opening 52 to the space 16 and outside air is admitted from the duct 40 to the blower.

From the above, the operation of the system is quite clear but, in other words, it may be stated that when maximum heating of the passenger compartment 12 is desired, hot engine air enters the casing 38 from the left as viewed in any of the figures in the drawing and with the damper 58 positioned as shown in full lines, all this heated air is urged into the passenger compartment 12 by means of the blower 46 and unheated outside air from the grille 24 is completely excluded.

Figure 3:
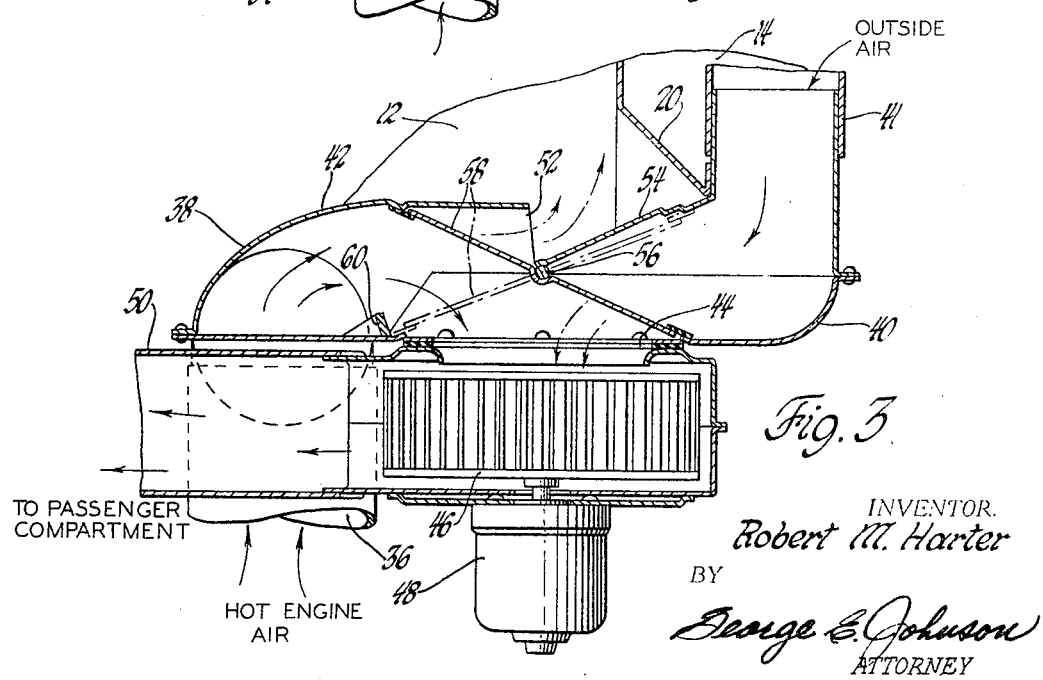
FIGURE 3 is a sectional view looking in the direction of the arrows 3—3 in FIGURE 2.

If ventilation only, unaccompanied by any heat from the engine, is desired, the damper 58 is placed in the dot and dash line position, FIGURE 3, with the result that outside air passes from the duct 40 and from the blower wheel 46 directly by way of the duct 50 to the passenger compartment 12. At this time, the heated air from the engine will pass through the opening 52 into the space 16 and eventually find its way downward toward the ground below. Because of the wall 54 and the damper 58 there is no interference by high pressure heated air with free entry of outside air. At intermediate temperature settings, opening 52 provides an escape route for unneeded high pressure heated engine air.

Obviously, an intermediate passenger compartment temperature may be had by properly positioning the damper 58 so that the damper casing 38 acts as a mixing chamber of heated and outside air in the proper proportions. An arcuate baffle 60 extends across the casing 38 to cooperate with the damper 58 as a preferred aid in controlling temperature linearity but it is not essential in practicing the present invention.

I claim:

1. A ventilating and heating system in a car having a passenger compartment and an air cooled engine compartment, said compartments being separated by an open space defined by partitions of said car, a blower with discharge duct work arranged to guide air from said blower to said passenger compartment, a casing forming an air inlet chamber communicating with the inlet of said blower, heated air duct work and outside air duct work arranged as separate air inlets to said casing, an air outlet connecting said casing to said space, and damper means arranged in said casing to control air flow through the latter.

2. A ventilating and heating system in a car having a main compartment and an engine compartment separated by a space open to the atmosphere, a blower having an inlet and an outlet, duct work connecting said outlet to said main compartment, a casing connected to said blower inlet and having an opening leading to said space, two separate ducts leading to said casing, one of said ducts being a source of heated air and the other being connected to the outside of said car as a source of ventilation air, and damper means in said casing and arranged to control the flow of air from said two ducts to said blower inlet and from said one duct to said opening and the atmosphere.

3. A system as set forth in claim 2, said casing including fixed baffle means separating said other duct from said opening to preclude by-passing of said blower by incoming outside air.

4. A system as set forth in claim 2, said car having a package shelf above said open space, said blower being in said open space, said one duct for heated air extending rearwardly in said car to said causing, and said other duct for ventilation air being directed forwardly in said car to said casing.

5. A ventilating and heating system in an automobile having partitions determining a passenger compartment and an engine compartment, said partitions also determining a space separating said compartments and open to the atmosphere, a blower in said space and having an outlet connected to said passenger compartment and an inlet, a casing with an opening on one side connected to the said blower inlet and an opening on its opposite side connected to said open space, a fixed baffle in said casing and traversing the width of the latter, an outside air duct and a heated air duct communicating with opposite sides of said casing, and a damper pivoted at one edge of said baffle and movable to one position for guiding outside air from said outside air duct to said blower and to another position for guiding heated air from said heated air duct to said space.

References Cited by the Examiner
UNITED STATES PATENTS

| | | | |
|---|---|---|---|
| 2,749,829 | 6/1956 | Simons | 98—2.4 |
| 3,096,938 | 7/1963 | Cole et al. | 237—12.3 |

EDWARD J. MICHAEL, *Primary Examiner.*